United States Patent
Jiang et al.

(10) Patent No.: US 10,379,648 B2
(45) Date of Patent: Aug. 13, 2019

(54) TOUCH SENSOR AND PREPARATION METHOD THEREOF

(71) Applicant: NUOVO FILM INC., Suzhou, Jiangsu Province (CN)

(72) Inventors: Kai Jiang, Suzhou (CN); Hakfei Poon, Mountain View, CA (US)

(73) Assignee: NUOVO FILM INC., Suzhou, Jiangsu Province (CN)

( * ) Notice: Subject to any disclaimer, the term of this patent is extended or adjusted under 35 U.S.C. 154(b) by 0 days.

(21) Appl. No.: 15/744,815

(22) PCT Filed: Sep. 21, 2015

(86) PCT No.: PCT/CN2015/090152
§ 371 (c)(1),
(2) Date: Jan. 14, 2018

(87) PCT Pub. No.: WO2017/012189
PCT Pub. Date: Jan. 26, 2017

(65) Prior Publication Data
US 2018/0210570 A1    Jul. 26, 2018

(30) Foreign Application Priority Data
Jul. 17, 2015  (CN) .......................... 2015 1 0422964

(51) Int. Cl.
*G06F 3/041*    (2006.01)

(52) U.S. Cl.
CPC .................. *G06F 3/041* (2013.01)

(58) Field of Classification Search
CPC ....................................... G06F 3/041
USPC ........................................ 345/168, 170–178
See application file for complete search history.

(56) References Cited

U.S. PATENT DOCUMENTS

| | | | | |
|---|---|---|---|---|
| 2011/0049579 A1* | 3/2011 | Dumitru | ................ | B82Y 10/00 257/254 |
| 2012/0025189 A1* | 2/2012 | Jeon | .................... | H01L 27/1446 257/53 |
| 2014/0139436 A1* | 5/2014 | Ramstein | ............ | H01L 41/0986 345/168 |
| 2014/0198072 A1* | 7/2014 | Schuele | .................. | G06F 3/044 345/174 |
| 2014/0362304 A1 | 12/2014 | Wang et al. | | |

FOREIGN PATENT DOCUMENTS

| | | |
|---|---|---|
| CN | 102544388 A | 7/2012 |
| CN | 104220964 A | 12/2014 |
| CN | 104298393 A | 1/2015 |
| CN | 104461115 A | 3/2015 |
| KR | 10-2012-0111607 A | 10/2012 |

* cited by examiner

*Primary Examiner* — Tony O Davis
(74) *Attorney, Agent, or Firm* — Cheng-Ju Chiang

(57) ABSTRACT

A touch sensor comprises a substrate, and a conductive thin film, the conductive thin film comprising an emitting layer, a receiving layer, and a piezoelectric layer sandwiched between the emitting layer and the receiving layer; the conductive thin film is provided with a conductive pattern region and a conductive channel region. By sandwiching a piezoelectric layer between an emitting layer and a receiving layer, the touch sensor integrates a touch feedback function, the structural technology is simple, and the cost is low.

8 Claims, 5 Drawing Sheets

TOUCH SENSOR AND PREPARATION METHOD THEREOF

CROSS REFERENCE TO RELATED APPLICATIONS

The present application is a 35 U.S.C. § 371 National Phase conversion of International (PCT) Patent Application No. PCT/CN2015/090152, filed on Sep. 21, 2015, which claims the priority of Chinese Patent Application No. 201510422964.X titled "Touch Sensor, and Preparation Method Therefor, and Display Device with Touch Sensor", filed on Jul. 17, 2015, which is incorporated herein by reference in its entirety. The PCT International Patent Application was filed and published in Chinese.

TECHNICAL FIELD

The present invention relates to a touch sensor, in particular to a touch sensor which is simple in structure and capable of feeding back a touch intensity and a preparation method thereof.

BACKGROUND

With the development of products such as mobile terminals, wearable devices, intelligent household electrical appliances, etc., demands of touch screens are increased continuously, and meanwhile the requirements on touch sensors are also becoming higher and higher.

However, a basic structure of an existing touch sensor includes an emitting layer, an optically clear adhesive (OCA), a receiving layer and cover plate glass. Usually the touch sensor has no feedback on a touch intensity, and the tactile feedback generally needs an extra tactile sensor. As a result, not only is the manufacturing process of devices more complicated, but also the user experience is non-ideal. For example, defects about thickness, weight, light transmittance and flexibility exist. It is well known that an existing tactile sensor needs dozens of process steps, and if the touch sensor is added, the overall thickness, light transmittance, flexibility, etc., all will be further affected.

In view of this, it is necessary to improve the existing touch sensor and a preparation method thereof, to solve the problems mentioned above.

SUMMARY

An object of the present invention is to provide a touch sensor which is simple in structure and capable of feeding back a touch intensity and a preparation method thereof, and a display device with the touch sensor.

An object of the present invention is to provide a touch sensor which is simple in structure and capable of feeding back a touch intensity and a preparation method thereof.

As further improvement of the present invention, the emitting layer is a transparent silver nanowire thin film, a carbon nanotube thin film and a graphene thin film; and the receiving layer is a transparent silver nanowire thin film, a carbon nanotube thin film or a graphene thin film.

As further improvement of the present invention, the piezoelectric layer is a PVDF thin film, a PVDF-TFE thin film, a doped PVDF thin film or a PVDF-PZT composite thin film.

As further improvement of the present invention, the substrate is PET, PC, COP, COC, PMMA, PI, transparent silica gel or flexible glass.

In order to realize the object of the invention mentioned above, the present invention further provides a preparation method for a touch sensor, which comprises the following steps: coating an emitting layer on a substrate, and drying and curing the emitting layer; coating a piezoelectric layer on the emitting layer, and drying and curing the piezoelectric layer; coating a receiving layer on the piezoelectric layer, and drying and curing the receiving layer; polarizing the piezoelectric layer; and etching the receiving layer, the piezoelectric layer and the emitting layer into patterns by a laser process, a photolithography process and a screen printing process.

In order to realize the object of the invention mentioned above, the present invention further provides another preparation method for a touch sensor, which comprises the following steps: providing a substrate, coating an emitting layer on the substrate, and drying and curing the emitting layer; providing an auxiliary substrate, coating a receiving layer on the auxiliary substrate, and drying and curing the receiving layer; coating a piezoelectric layer on the receiving layer or the emitting layer, and drying and curing the piezoelectric layer; adhering the emitting layer or the receiving layer not coated with the piezoelectric layer to the piezoelectric layer by a conductive adhesive, and removing the auxiliary substrate; polarizing the piezoelectric layer; and etching the receiving layer, the piezoelectric layer and the emitting layer into patterns by a laser process, a photolithography process and a screen printing process.

As further improvement of the present invention, the emitting layer, the piezoelectric layer and the receiving layer adopt a coating manner of scraper coating, spin coating or slot extrusion coating.

As further improvement of the present invention, the emitting layer is a transparent silver nanowire thin film, a carbon nanotube thin film, a graphene thin film or an ITO thin film; and the receiving layer is a transparent silver nanowire thin film, a carbon nanotube thin film, a graphene thin film or an ITO thin film.

As further improvement of the present invention, the piezoelectric layer is a PVDF thin film, a PVDF-TFE thin film, a doped PVDF thin film or a PVDF-PZT composite thin film.

The present invention has the beneficial effects:

According to the touch sensor of the present invention, by sandwiching the piezoelectric layer between the emitting layer and the receiving layer, the touch sensor integrates a tactile feedback function, the structure and the preparation process of the touch sensor is simple, and the cost thereof is low.

DETAILED DESCRIPTION

Figure 1:
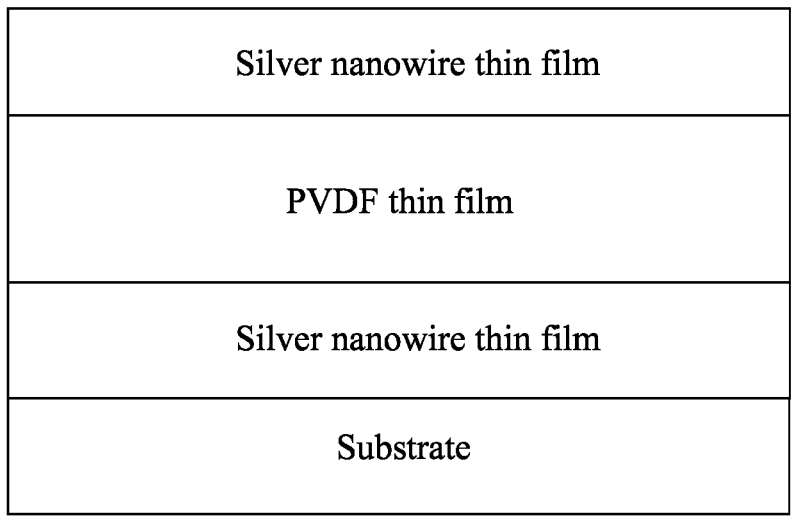
FIG. 1 is a simplified structural schematic diagram in which a substrate and conductive thin films of a touch sensor of the present invention are combined.

The objects, technical resolutions and advantages of the present invention will become more clearly through detailed description of the embodiments of the present invention in conjunction with the accompany drawings.

Referring to FIGS. 1 to 4, the present invention provides a touch sensor, comprising a substrate and a conductive thin film located on the substrate. The conductive thin film comprise an emitting layer, a receiving layer and a piezoelectric layer sandwiched between the emitting layer and the receiving layer, wherein no clearance exists between any two adjacent layers of the conductive thin film.

The touch sensor has a view window region for user interaction and a peripheral region surrounding the view window region, the conductive thin films in the view window region have conductive pattern regions and conductive channel regions, and the peripheral region is provided with a conductive circuit communicated with the receiving layer and the emitting layer to transmit an electric signal, and an IC chip connected on the conductive circuit.

The substrate is a flexible substrate, for example, made of polyethylene terephthalate (PET), polycarbonate (PC), cyclo olefin polymers (COP), cyclo olefin copolymers (COC), polymethyl methacrylate (PMMA), polyimide (PI), transparent silica gel or flexible glass.

The piezoelectric layer is a polyvinylidene fluoride (PVDF) thin film, a polyvinylidene fluoride-trifluoroethylene (PVDF-TFE) thin film, a PVDF thin film doped with silver and the like or a polyvinylidene fluoride-lead zirconate titanate (PVDF-PZT) composite thin film.

The emitting layer is a transparent silver nanowire thin film, a carbon nanotube thin film, a graphene thin film or an ITO thin film. A flexible thin film such as the silver nanowire thin film, etc., is preferable as it is high in flexibility, high in bending resistance and will not be fractured in a pressing process. If a hard thin film such as an indium tin oxide (ITO) thin film, etc., is selected, as it can be easily fractured by pressing, an elastic polydimethylsiloxane (PDMS) material is required to serve as a buffer layer and/or a clearance should be reserved between the ITO thin films prevent the ITO thin films from being fractured when the ITO thin films are pressed.

The receiving layer is a transparent silver nanowire thin film, a carbon nanotube thin film, a graphene thin film or an ITO thin film. A flexible thin film such as the silver nanowire thin film, etc., is preferable, as it is high in flexibility, high in bending resistance and will not be fractured in a pressing process. If a hard thin film such as an ITO thin film, etc., is selected, as it can be easily fractured by pressing, an elastic PDMS material is required and a clearance should be reserved between ITO electrodes to prevent the ITO thin films from being fractured when they are pressed.

In addition, the silver nanowire thin film has an amplifying action on a piezoelectric action of the piezoelectric layer. Particularly, when the emitting layer and/or the receiving layer is the silver nanowire thin film and the piezoelectric layer is the PVDF thin film, silver nanowires on the surface and PVDF of the piezoelectric layer form a silver wire-doped PVDF piezoelectric layer, and the piezoelectric effect will be more obvious. That is, a tactile feedback signal obtained under the same pressure is higher. The piezoelectric coefficients under different ratios of the silver wire to the PVDF are compared in the following table.

| Silver nanowire/PVDF Ratio | Piezoelectric coefficient (pC/N) |
| --- | --- |
| 0% | 15.4 |
| 1% | 23.1 |
| 2% | 27.8 |
| 3% | 23.4 |

Figure 2A:
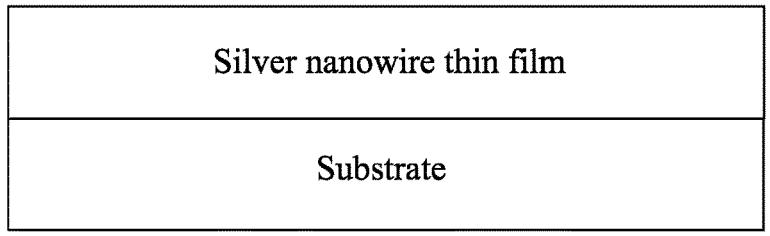
FIGS. 2A to 2C are flowcharts of preparing a conductive thin film using the preparation method for a touch sensor of the present invention.
Figure 2B:
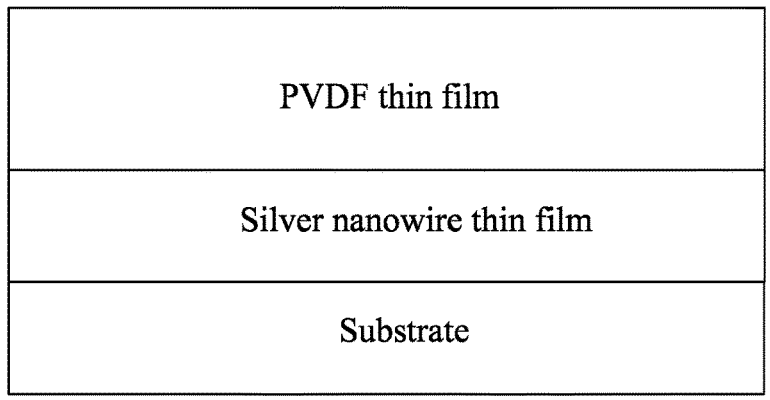
Figure 2C:
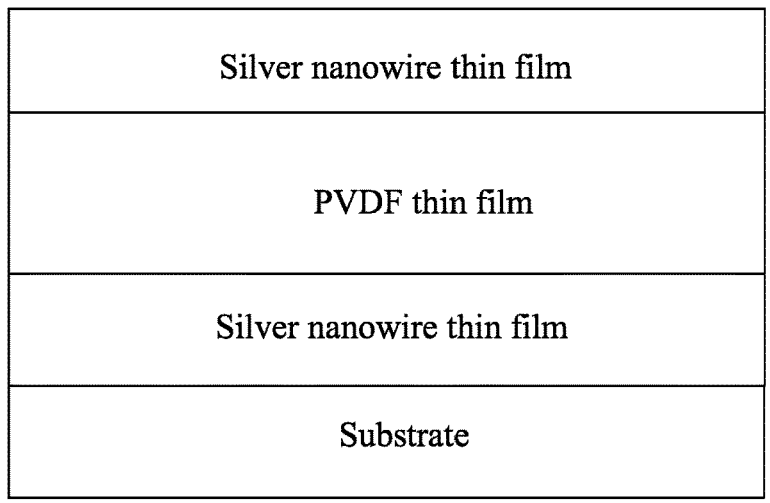
Figure 3A:
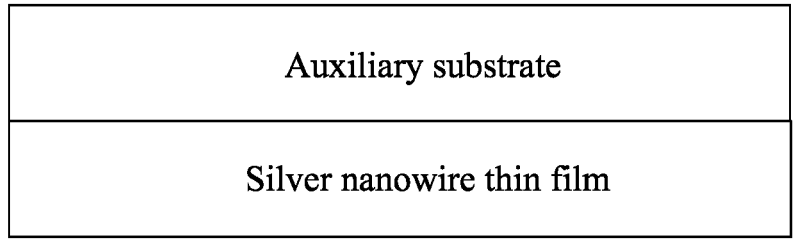
FIGS. 3A to 3D are flowcharts of preparing a conductive thin film using the preparation method for a touch sensor in another embodiment of the present invention.
Figure 3B:
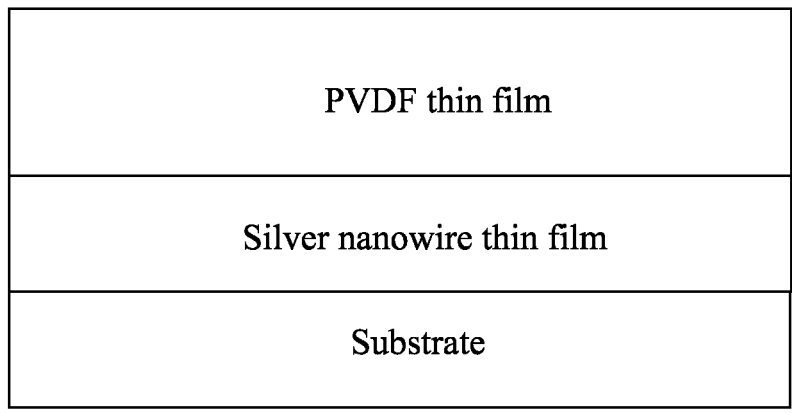
Figure 3C:
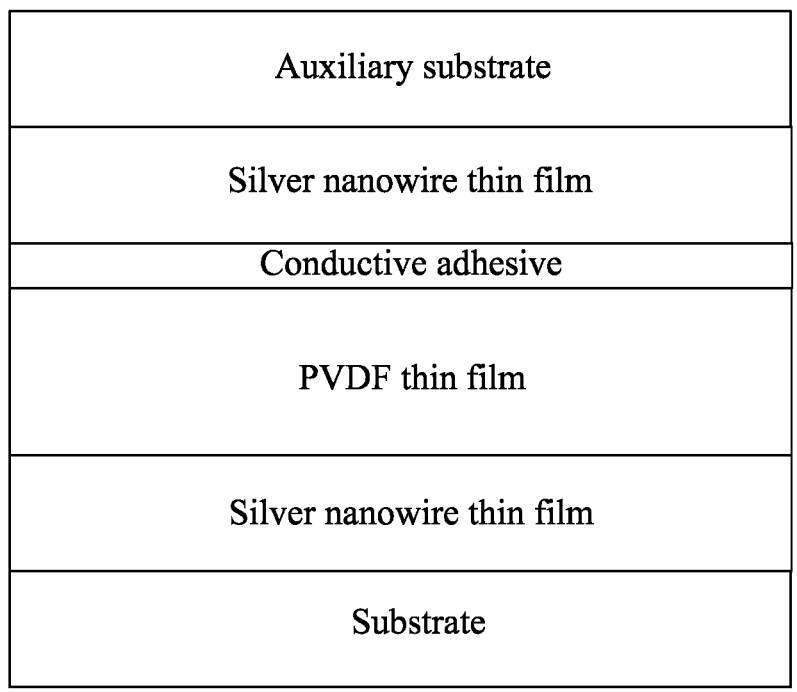
Figure 3D:
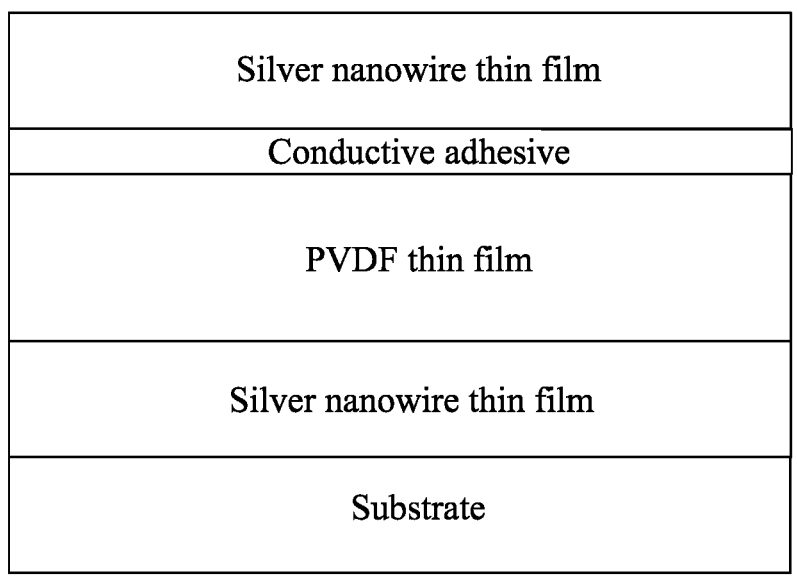
Figure 4:
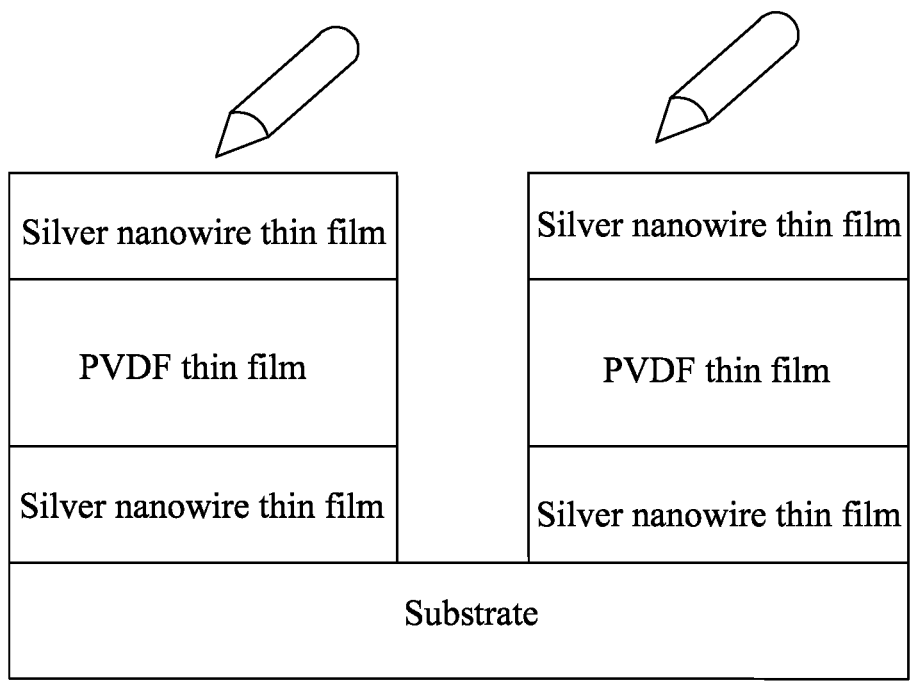
FIG. 4 is a structural schematic diagram of etched patterns of FIG. 1.

Referring to FIGS. 2A and 4, in order to realize the object of the invention mentioned above, the present invention further provides a preparation method for the touch sensor, which comprises the following steps: coating an emitting layer on the substrate, and drying and curing the emitting layer; coating a piezoelectric layer on the emitting layer, and drying and curing the piezoelectric layer; coating a receiving layer on the piezoelectric layer, and drying and curing the receiving layer; polarizing the piezoelectric layer; and etching the receiving layer, the piezoelectric layer and the emitting layer into patterns by a laser process, a photolithography process and a screen printing process, and forming conductive pattern regions and conductive channel regions. Drying and curing time and temperatures of the emitting layer, the piezoelectric layer and the receiving layer are correspondingly adjusted according to different material characteristics. FIGS. 2A to 2C only illustrate flowcharts of forming the conductive thin film on the substrate, and shows no steps of polarizing the piezoelectric layer and etching the piezoelectric layer into patterns.

The emitting layer, the piezoelectric layer and the receiving layer of the present invention are coated on the substrate by adopting a non-vacuum coating manner of scraper coating, spin coating or slot extrusion coating or a manner of ink-jet printing to form the corresponding conductive thin films. Thus, the operation conditions can be easily achieved and the process is simple. By taking the emitting layer and the receiving layer being the silver nanowire thin films respectively and the piezoelectric layer being the PVDF thin film as examples, the preparation method for a touch sensor is illustrated.

A layer of a silver nanowire solution is coated on the substrate, and is dried and cured to form the silver nanowire thin film; then a layer of a PVDF solution is coated on the cured silver nanowire thin film and is dried and cured to form a PVDF thin film; afterwards, a layer of the silver nanowire thin film is coated on the PVDF thin film, and is dried and cured to form the silver nanowire thin film; the PVDF thin film is polarized; and the silver nanowire thin film, the PVDF thin film and the silver nanowire thin film are etched into patterns by a laser process to form conductive pattern regions and conductive channel regions. The step of polarizing the PVDF thin film can also be carried out after the PVDF solution is dried and cured.

The specific implementing method comprises the following steps.

A uniformly dispersed silver nanowire solution with a concentration of 0.05%-0.5% is prepared in advance and is then uniformly coated on the substrate by using scraper coating or spin coating or slot extrusion coating. Then a solvent is volatilized completely by an oven of 100° C.-150° C. and baking and curing are performed for 5-15 minutes.

A PVDF solution with a concentration of 0.1%-10% is prepared in advance and is then uniformly coated on the surface of the substrate where silver nanowire is well-cured and well coated by using scraper coating or spin coating or slot extrusion coating. Then a solvent is volatilized completely by an oven of 50° C.-150° C. and baking and curing are performed for 5-15 minutes.

On the surface of the substrate where the silver nanowire and the PVDF are well coated, a nano silver conductive layer is uniformly coated and cured by using scraper coating or spin coating or slot extrusion coating according to the first step.

Finally, a PVDF coating sandwiched between the two nano silver wire conductive layers is electrically polarized, and a constant voltage of 30V-100V is applied to the two layers of nano silver conductive layers for about half an hour to form a piezoelectric thin film.

Referring to FIGS. 3A to 3D, another preparation method for a touch sensor of the present invention is shown, which differs from the preparation method mentioned above in a process for forming the conductive thin films. The preparation method comprises the following steps: providing a substrate, coating an emitting layer on the substrate, and drying and curing the emitting layer; providing an auxiliary substrate, coating a receiving layer on the auxiliary substrate, and drying and curing the receiving layer; coating a piezoelectric layer on the receiving layer or the emitting layer, and drying and curing the piezoelectric layer; adhering the emitting layer or the receiving layer not coated with the piezoelectric layer to the piezoelectric layer by a conductive adhesive, and removing the auxiliary substrate; polarizing the piezoelectric layer; and etching the receiving layer, the piezoelectric layer and the emitting layer into patterns by a laser process, a photolithography process and a screen printing process. The coating process for each layer is same as that of the embodiment mentioned above and is not repeated.

When a finger or the tip of a touch pen contacts the surface of the touch sensor, a capacitance signal changes due to medium proximity, i.e., proximity of the finger or the touch pen. In addition, due to a pressure applied by the pen tip or the finger, the piezoelectric layer is pressed to generate charges, such that a capacitance value signal is changed. The IC chip can calculate a location of the finger and the used pressure by the change of the signal value and feeds back to a user.

The present invention further provides a display device with the touch sensor mentioned above, such as a mobile communication device, a wearable device, an intelligent household electrical appliance, etc., which has the touch screen.

The present invention has the beneficial effects: according to the touch sensor of the present invention, by sandwiching the piezoelectric layer between the emitting layer and the receiving layer, the touch sensor integrates a tactile feedback function, the structure and the preparation process of the touch sensor is simple, and the cost thereof is low. In addition, the preparation method for a touch sensor is simple in process and low in cost.

The foregoing embodiments are merely intended for explaining rather than limiting the technical solution of the present invention. Although the present invention has been described in detail by referring to the preferable embodiments, it should be understood by those skilled in the art that modifications or equivalent substitutions can be made to the technical solution of the present invention without departing from the spirit and scope of the technical solution of the present invention.

What is claimed is:

1. A preparation method for a touch sensor, comprising the following steps:
   coating an emitting layer on a substrate, and drying and curing the emitting layer;
   coating a piezoelectric layer on the emitting layer, and drying and curing the piezoelectric layer;
   coating a receiving layer on the piezoelectric layer, and drying and curing the receiving layer;
   polarizing the piezoelectric layer; and
   etching the receiving layer, the piezoelectric layer and the emitting layer into patterns by a laser process, a photolithography process and a screen printing process.

2. The preparation method for a touch sensor according to claim 1, wherein the emitting layer, the piezoelectric layer and the receiving layer adopt a coating manner of scraper coating, spin coating or slot extrusion coating.

3. The preparation method for a touch sensor according to claim 1, wherein the emitting layer is a conductive thin film forming by metal nanowire, a carbon nanotube thin film, a graphene thin film, an indium tin oxide thin film or hybrid of the mentioned above, and the metal nanowire is especially silver nanowire or copper nanowire; and the receiving layer is a conductive thin film forming by metal nanowire, a carbon nanotube thin film, a graphene thin film, an indium tin oxide thin film or hybrid of the mentioned above, and the metal nanowire is especially silver nanowire or copper nanowire.

4. The preparation method for a touch sensor according to claim 1, wherein the piezoelectric layer is a PVDF thin film, a PVDF-TFE thin film, a doped PVDF thin film or a PVDF-PZT composite thin film.

5. A preparation method for a touch sensor, comprising the following steps:
   providing a substrate, coating an emitting layer on the substrate, and drying and curing the emitting layer;
   providing an auxiliary substrate, coating a receiving layer on the auxiliary substrate, and drying and curing the receiving layer;
   coating a piezoelectric layer on the receiving layer or the emitting layer, and drying and curing the piezoelectric layer;
   adhering the emitting layer or the receiving layer not coated with the piezoelectric layer to the piezoelectric layer by a conductive adhesive, and removing the auxiliary substrate;
   polarizing the piezoelectric layer; and
   etching the receiving layer, the piezoelectric layer and the emitting layer into patterns by a laser process, a photolithography process and a screen printing process.

6. The preparation method for a touch sensor according to claim 5, wherein the emitting layer, the piezoelectric layer and the receiving layer adopt a coating manner of scraper coating, spin coating or slot extrusion coating.

7. The preparation method for a touch sensor according to claim 5, wherein the emitting layer is a conductive thin film forming by metal nanowire, a carbon nanotube thin film, a graphene thin film, an indium tin oxide thin film or hybrid of the mentioned above, and the metal nanowire is especially silver nanowire or copper nanowire; and the receiving layer is a conductive thin film forming by metal nanowire, a carbon nanotube thin film, a graphene thin film, an indium tin oxide thin film or hybrid of the mentioned above, and the metal nanowire is especially silver nanowire or copper nanowire.

8. The preparation method for a touch sensor according to claim 5, wherein the piezoelectric layer is a PVDF thin film, a PVDF-TFE thin film, a doped PVDF thin film or a PVDF-PZT composite thin film.

* * * * *